(No Model.)

O. HAMMERSTEIN.
MACHINE FOR CUTTING CIGAR WRAPPERS.

No. 390,167. Patented Sept. 25, 1888.

WITNESSES:
Gustave Dieterich
T. F. Bowne

INVENTOR
Oscar Hammerstein
BY
Briesen & Steele
ATTORNEYS

N. PETERS, Photo-Lithographer, Washington, D. C.

United States Patent Office.

OSCAR HAMMERSTEIN, OF NEW YORK, N. Y., ASSIGNOR TO GUSTAV FALK AND ARNOLD FALK, OF SAME PLACE, AND THE UNIVERSAL CIGAR ROLLING MACHINE COMPANY, OF JERSEY CITY, NEW JERSEY.

MACHINE FOR CUTTING CIGAR-WRAPPERS.

SPECIFICATION forming part of Letters Patent No. 390,167, dated September 25, 1888.

Application filed February 25, 1888. Serial No. 265,275. (No model.)

*To all whom it may concern:*

Be it known that I, OSCAR HAMMERSTEIN, a resident of the city, county, and State of New York, have invented an Improved Machine for Cutting Wrappers for Cigars or other Analogous Sheets, of which the following is a specification.

The object of my invention is to provide an improved machine for cutting in the desired shape the wrappers for cigars or other analogous sheets.

The invention consists in the details of improvement and the combinations of parts, that will be more fully hereinafter set forth.

Reference is to be had to the accompanying drawings, forming part of this specification, in which—

Figure 1:
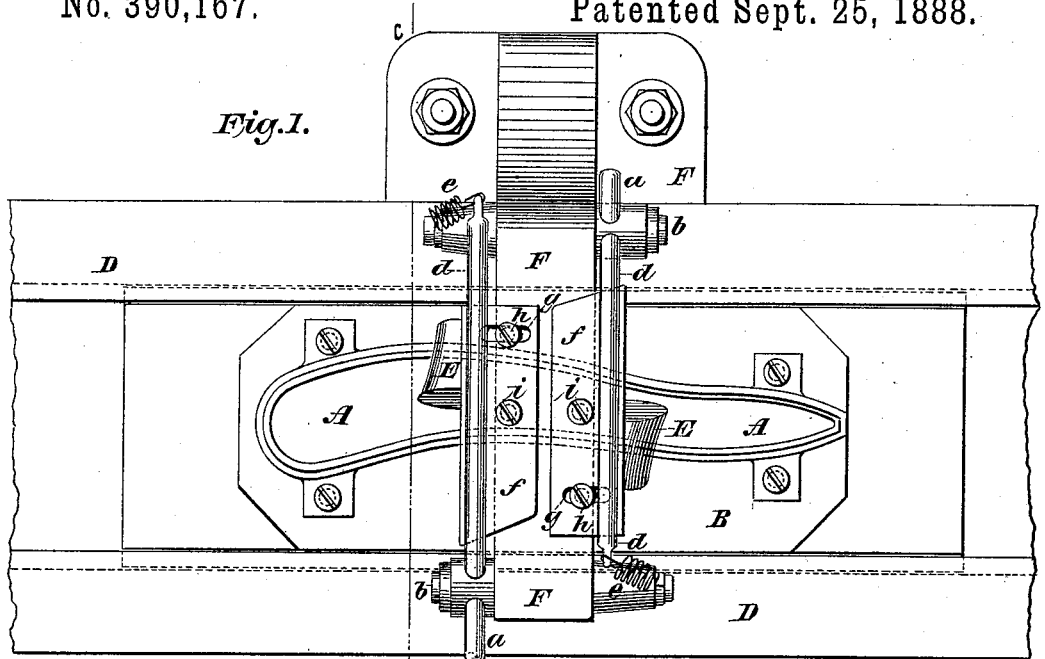
Figure 2:
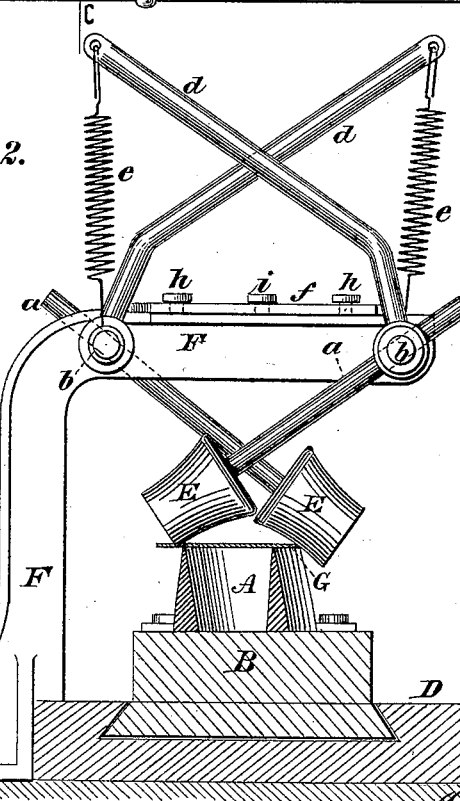

Figure 1 is a plan view of a machine for cutting cigar-wrappers or other analogous sheets constructed according to my invention; and Fig. 2 is a vertical cross-section on the line *c c*, Fig. 1.

In the accompanying drawings, the letter A represents a die or cutter for the tobacco-leaves. The die or cutter A may be of approved outline for forming the wrappers or things to be cut. For wrappers I prefer the outline substantially as shown in Fig. 1. The die or cutter A, instead of being open centrally with tapering vertical sides, as shown, may be a solid piece having the proper outline. Said die or cutter is adapted to be reciprocated longitudinally, and for this purpose I mount it on a sliding support or block, B, that is guided in a grooved or other suitably-arranged base, D.

E E are two rollers, preferably concave, as shown, that bear upon the cutting-edges of the die or cutter A at an obtuse angle. These rollers E E are mounted on spindles *a a*, that are secured to short shafts *b b*, suitably journaled in a bracket, F. The bracket F is supported on the base D and extends over the die or cutter A, as clearly shown. The spindles *a a* are carried above the die or cutter A at an obtuse angle, so that the rollers E E will bear upon the outer side of the cutting-edge of the die, as shown.

The rollers E E are designed to be vertically movable above the die or cutter A and exert a certain pressure upon the die. For this purpose I secure to the shafts *b b* upwardly-extending arms or cranks *d d*, as shown in Fig. 2. To the outer or free ends of the cranks *d d*, I attach springs *e e*, the other ends of which springs are secured to the bracket F or other support. These springs *e e*, by drawing down the outer ends of the cranks *d d*, serve to press the rollers E E upon the die or cutter A.

To regulate the downward movement of the rollers E, and also their pressure upon the die A, I pivot to the bracket F plates *f f*, that abut at one end against the cranks *d d*. These plates *f f*, at the ends that abut against the cranks *d*, are preferably beveled. The plates are also provided with slots *g*, that receive screws *h*, which screws pass into the bracket F and serve to hold the plates *f* in position. By turning the plates *f f* on their pivots *i*, so as to bring a different part of their beveled ends opposite the cranks, the downward movement of said cranks, and thereby the rollers E E, and the pressure of said rollers on the die or cutter A, may be limited and regulated; but instead of pivoting the plates *f*, as shown, they could be moved longitudinally toward the cranks *d*. In this case their ends need not be beveled.

To cut or crease a wrapper by my improved machine, I proceed as follows: The die or cutter A is drawn from beneath the rollers E, or the rollers moved over the die. The wrapper G is first preferably moistened and then laid upon the die. The die or cutter, carrying the wrapper, is then advanced under the rollers, or the latter over the die, so that the rollers by pressing upon the wrapper and cutter cut or crease the wrapper in the proper outline. The wrapper is now removed from the die, and will be found of the desired form.

As shown, the rollers E E do not bear directly upon the extreme upper edge of the die, but bear upon the side thereof at an obtuse angle. By this means the wrapper is readily cut, the roller at the same time acting to sharpen the edge of the die. With this construction the die or cutter may be used continuously without being sharpened by other means than that shown.

Although I have shown two rollers, E E, as bearing upon the side of the cutting-edge, it is evident that one roller could be used solely. In this case the die or cutter would be passed under the roller or the roller over the die, said roller bearing upon the die or cutter at the obtuse angle, as shown. After the die has passed from under the roller or the roller from over the die, said die or roller, whichever is moved, will be turned around, and then passed back to its first position. In this backward passage the roller will bear upon the opposite edge of the die. Thus the two sides of the wrapper will be cut in succession.

I do not claim a horizontal pressure-roller combined with a cutter. Such rollers have been used; but they blunt the cutter, and are themselves creased in operation. My inclined rollers tend rather to sharpen than to dull the cutter, and are themselves not creased or injured in the operation.

Having now described my invention, what I claim is—

1. The combination, with a cutting-die, of the roller E, that bears upon the cutting-edge or angle of the die at an obtuse angle, one being movable with relation to the other, and a spindle for supporting said roller, substantially as described.

2. The cutting-die A, combined with the roller E, that bears upon the cutting-edge of the die at an obtuse angle, one being movable with relation to the other, spindle $a$, carrying the roller E, and spring actuated crank $d$, for pressing the roller E upon the die, substantially as described.

3. The cutting-die A, combined with the roller E, one being movable with relation to the other, spindle $a$, carrying said roller, spring-actuated crank $d$, and plate $f$, for regulating the movement of the crank $d$, substantially as described.

4. The combination of the cutting-die A with the inclined rollers E E, that bear upon opposite sides of said die, one being movable with relation to the other, spindles $a$ $a$, that carry said rollers, and means, substantially as described, for pressing the rollers upon the die and for regulating such pressure, as specified.

5. The combination of the cutting-die A, that is guided on the base D, bracket F, that extends over said die, shaft $b$, spindle $a$, carried thereby, roller E, carried by said spindle, spring-actuated crank $d$, and adjusting-plates, substantially as herein shown and described.

OSCAR HAMMERSTEIN.

Witnesses:
HARRY M. TURK,
T. F. BOWINE.